W. BAKER.
Improvement in Cotton-Cultivators.
No. 129,081.                                  Patented July 16, 1872.
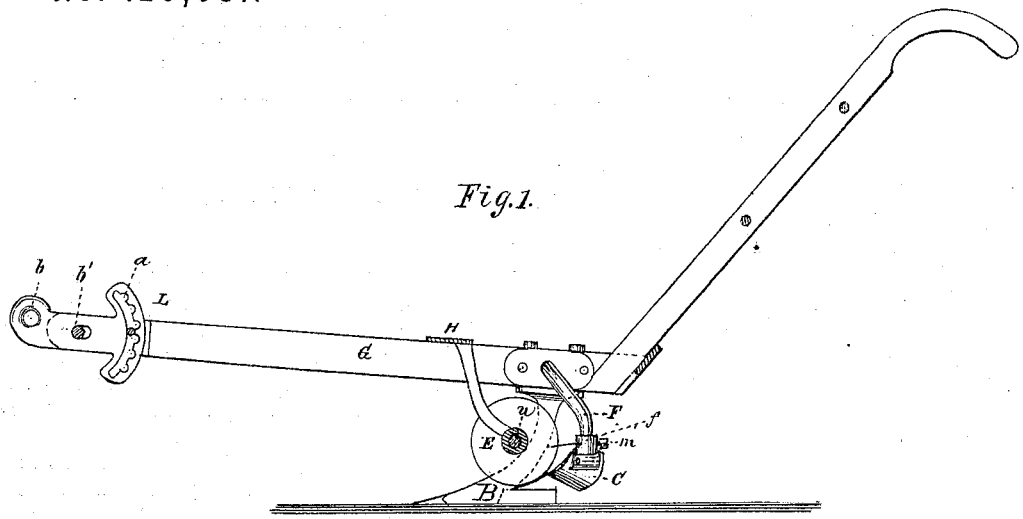
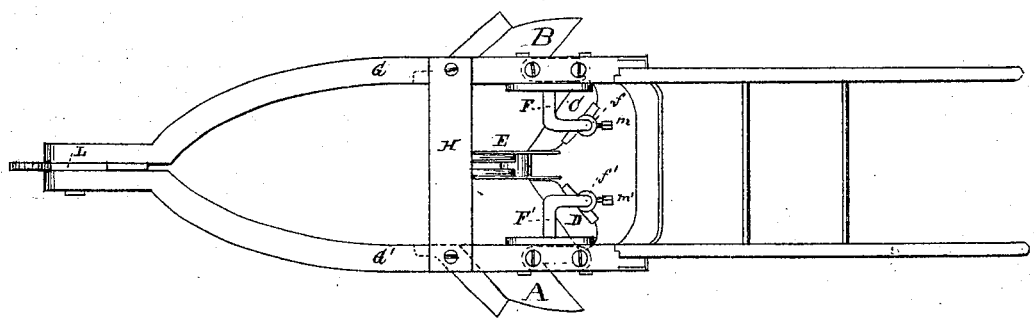
Witnesses:
G. Mathys.
Thos. D. D. Curand
Inventor:
Wilson Baker
per
Attorneys.

UNITED STATES PATENT OFFICE.

WILSON BAKER, OF MEMPHIS, TENNESSEE.

IMPROVEMENT IN COTTON-CULTIVATORS.

Specification forming part of Letters Patent No. 129,081, dated July 16, 1872.

Specification describing an Improvement in Cotton-Cultivators, invented by WILSON BAKER, of Memphis, in the county of Shelby and State of Tennessee.

The invention relates to means for scraping and chopping out cotton. This is slow and tedious, but must be performed once on every crop, and in such a way as to leave plants in a row. I propose to cut away at one operation a certain portion of soil from each side of ridge by means of two plows, while scrapers clear the edges and while a double, circular, and revolving cutter makes two parallel lines, one on either side of cotton row, and also prevents clods or trash from falling on the young plants.

In the drawing, Figure 1 is a longitudinal section. Fig. 2 is a top view.

A B represent, respectively, a right-and-left-handed plow attached to beams G G'. These beams converge to a point in front, where they are clamped by a suitable fastening on the tug-iron L. This has an irregular slot, $a$, and apertures $b\ b'$. This tug-iron may be adjusted by slacking the screws, when the long slot $b$ allows it to be drawn back and raised or depressed. C D are the scrapers secured to standards F F' by the sockets $f\ f'$ and the set-screws $m\ m'$ placed at the back of scrapers. These standards are fastened opposite to each other on the inner sides of beams G G' and each held by two bolts. The shape of the scrapers is peculiar, being made to conform to the shape of a cotton ridge, and they are adjustable to any desired angle or elevation on the standards F F' by means of the screws and sockets. E is the revolving cutter, which has two blades rigidly secured at about three inches apart on a revolving shaft, $u$. H is an iron bar placed across the beams, to which the blades are appended and by which they are supported in the desired position. The scraper C may be attached to any turning-plow, and enables the "barring off" and "scraping" to be done at one operation. This allows one team to do the work of two, while the whole implement performs the work of four men and as many horses.

Having thus described my invention, what I claim as new, and desire to secure by Letters Patent, is—

The combination, in a straddle-row cultivator, of a bar-shear plow, A B, on each side, the scrapers C D next thereto, and the inner revolving cutters, as described, and for the purpose of enabling it to operate as set forth.

WILSON BAKER.

Witnesses:
   JOHN A. ROUSH,
   ROBERT B. MILLER.